United States Patent Office 3,056,582
Patented Oct. 2, 1962

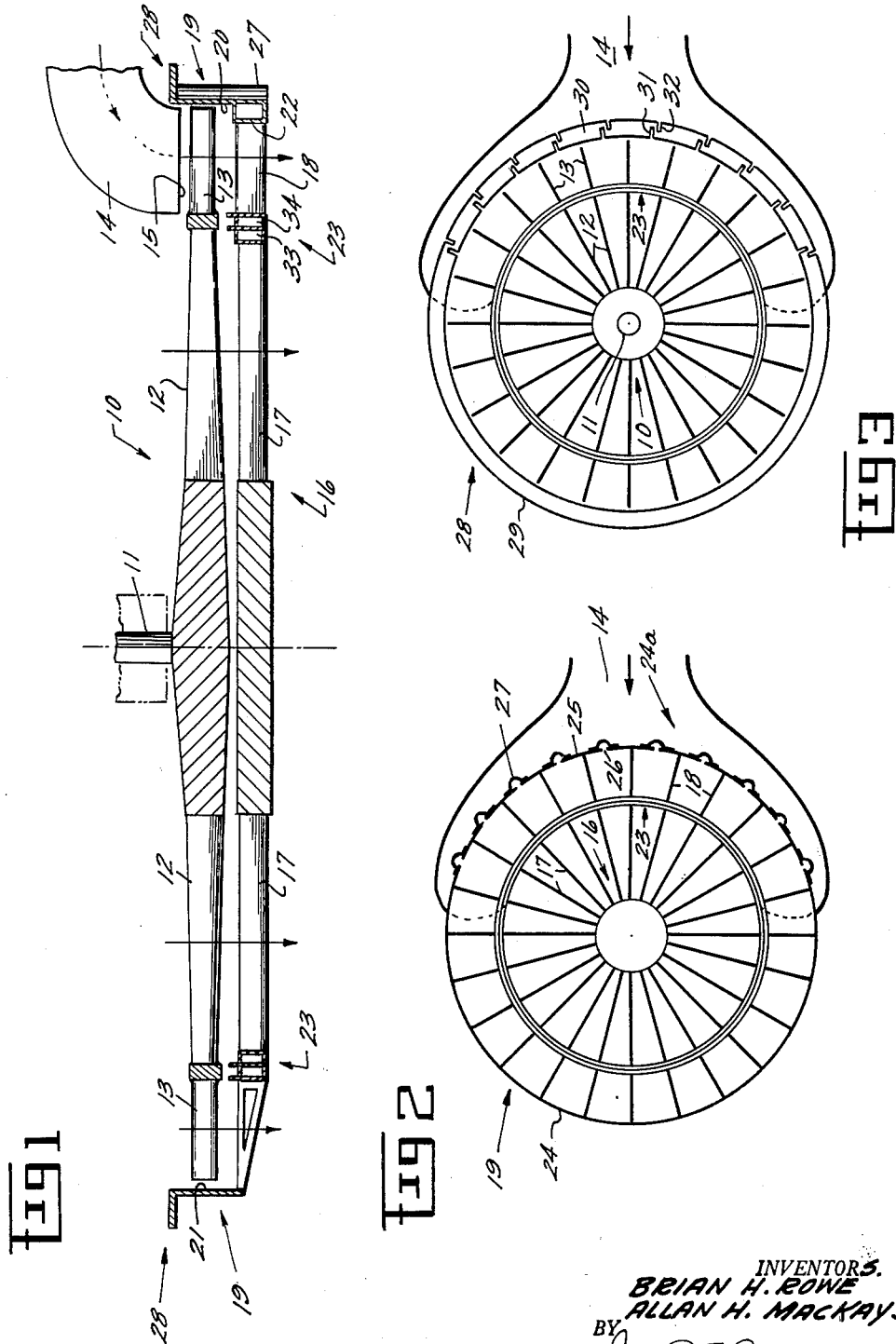

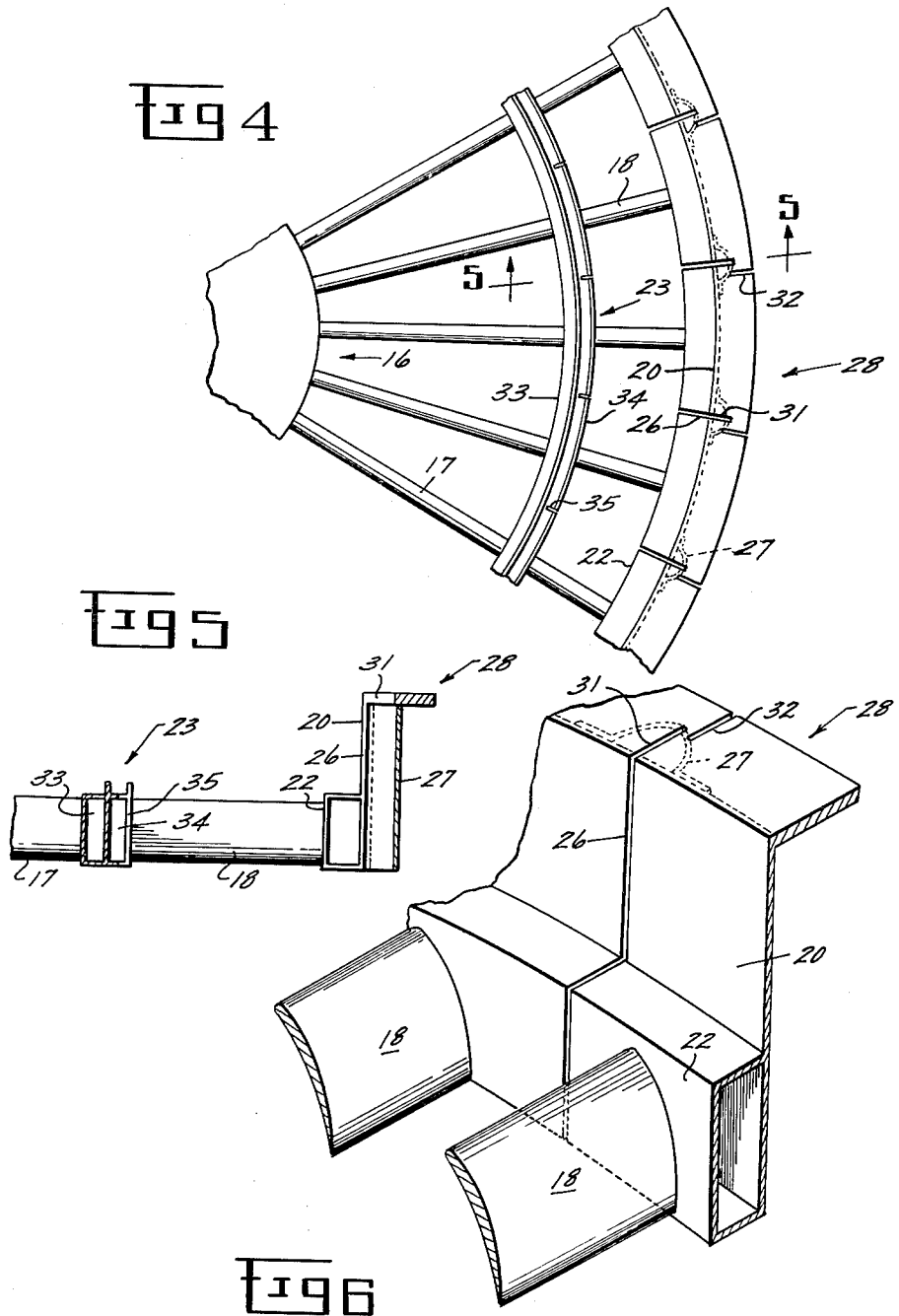

3,056,582
TURBINE STATOR CONSTRUCTION
Brian H. Rowe and Allan H. MacKay, Jr., Cincinnati, Ohio, assignors to General Electric Company, a corporation of New York
Filed Aug. 26, 1960, Ser. No. 52,267
5 Claims. (Cl. 253—78)

This invention relates to a stator construction for a turbine driven by the force of gas at high temperature directed over vanes or buckets carried by the tips of the rotor blades. More particularly, this invention relates to a stator for a gas turbine wherein means are provided for ensuring a desired clearance between the tips of the turbine vanes and the portion of the stator which surrounds the rotor.

This invention may be set in the environment of a "tip turbine," or turbine of the type used in VTOL aircraft and wherein the propelling gases are directed only against turbine vanes or buckets carried at the outer periphery of the rotor, the remainder of the rotor being relatively insulated from the heat of the propelling gases. The environment further involves a stator assembly including stator vanes for straightening the flow of air and an annular member for supporting the vanes and other parts of the turbine apparatus, and furnishing a casing for the rotor. Just as the rotor vanes or buckets are subject to expansion and contraction under the influence of the heat of the propelling gases, a portion of the stator will likewise be subject to the flow of propelling gases and, hence, subject to dimensional change. This stator must retain rigidity to provide the necessary support and to maintain fixed locating points and dimensions which are dependent upon it. In the environment of this invention, the stator is integral with an annular member entirely surrounding the periphery of the rotor for furnishing a casing for the rotor and supporting certain elements related to the apparatus. Where the stator includes such an annular member tied to radial or diametrical struts, its dimensional change must be expected to be unlike that of the turbine rotor vanes, which are subject to radial expansion only. The environment of this invention may further involve an arrangement wherein the propelling gases are admitted to the rotor vanes about only a sector of the turbine annulus, rather than about the full 360 degrees of the turbine circumference. The problem raised by the situations posed is one of maintaining a desired amount of clearance between the turbine bucket tips and the surrounding annular portion of the stator notwithstanding the variable effects of the temperature changes. The stator is subject to both tangential expansion of the annulus and radial expansion of the stator blades. Thus, excessive expansion of this stator relative to the rotor will result in an excessive amount of clearance therebetween and, hence, losses in the usable energy of the driving gases. In the case of only partial admission of the propelling gases, the problem is compounded since the heat of the gases will be present about only a portion of the stator, while the remainder of the stator circumference will be unaffected.

One object of this invention is to provide a stator construction for a turbine which is provided with compensation for uneven expansion relative to the turbine rotor.

Another object is to provide a stator construction which will ensure desired tip clearance for a tip turbine throughout the range from cold to hot operation.

Another object is to provide a stator construction ensuring desired tip clearance for a turbine driven by admission of propelling gases about only a portion of the turbine circumference.

Briefly, and in accordance with one aspect of the invention, the stator construction includes an annular outer casing having upstanding walls, as viewed with the axis of the stator vertical. In the instance of the admission of propelling gases about a partial circumference, this casing comprises a first portion which is solid or continuous and a second portion which is interrupted by spaced openings so as to comprise a plurality of separate segments. These segments are joined by expansible strip members extending from top to bottom of the adjacent segments, closing the spaces therebetween. In the instance of the admission of propelling gases about the full 360 degree circumference of the turbine, the entire casing could be formed of segments joined by the expansible strips.

In accordance with another aspect of the invention, the stator construction includes a ring of approximately the same inside diameter as the casing described above. This ring is fixed to the casing about the top rim of the upstanding wall, in the manner of a flange. This outer casing ring is provided with a first plurality of radial slots about the inside circumference, extending only partially through the width of the ring; the outside circumference is provided with a second plurality of radial slots, also extending only partially through the width of the ring. The inside slots in the ring coincide with the spaced openings between adjacent segments of the casing. The outside slots are preferably staggered or offset from the inside slots so as to be spaced laterally from and lie alongside the latter. However, the inside slots could be extended through the ring to avoid the separate staggered outside slots and the suitable expansible strip members would perform the same function. In the instance of admission of propelling gases about the partial circumference of the turbine, the ring may be slotted about a portion of its circumference coinciding with the segmented portion of the casing. In the instance of admission about the full circumference, the entire circumference of the ring will be slotted.

Cooperating with the outer casing is a system of radial stator blades or vanes, joining the outer casing with a hub of the stator in much the manner of spokes in a wheel. A ring is provided intermediate to the outer casing and the hub. This ring maintains a fixed radius and separates the outer peripheral area of the stator, through which passes the hot driving gases in the tip turbine design, from the inner portion of the stator. In accordance with the invention, this intermediate ring is formed of inner and outer contiguous sections, the outer section being adapted, by a system of radial slots, for expansion independently of the inner section which remains fixed radially.

The arrangement thus briefly described provides a stator assembly capable of controlled expansion and contraction in response to the influence of hot gases driving the turbine, the dimensional change thus resulting finding compensation in its inherent construction, so that a desired clearance between the tips of the rotor vanes and the surrounding casing of the stator is maintained.

Further objects, features, and attending advantages of the invention will become apparent by reference to the following specifications and drawings, in which:

FIGURE 1 is a partial view in side elevation showing the turbine rotor and stator;

FIGURE 2 is a simplified partial view in plan of the stator showing in particular the outer casing of this invention;

FIGURE 3 is a simplified partial view in plan of the outer casing ring;

FIGURE 4 is an enlarged partial view of a portion of the stator viewed in plan;

FIGURE 5 is a view taken along line 5—5 of FIGURE 4; and,

FIGURE 6 is a partial perspective view of the details of the outer ring structure.

With reference to FIGURE 1, a turbine rotor, generally indicated at 10, is shown rotatable about a shaft 11, and having blades 12 and buckets or vanes 13 mounted on the tips of the blades 12. Blades 12 may be considered as delivering a flow of air downwardly, in VTOL applications, when driven by the force of propelling gases upon buckets or vanes 13. The high velocity flow of propelling gases, generated by a suitable source, not shown, is directed by way of a scroll, designated generally at 14, having an outlet 15, against the tip turbine, and by reference to FIGURES 2 and 3, it will be seen that the scroll extends about only a portion of the turbine circumference.

With further reference to FIGURE 1, the turbine assembly includes a stator, generally designated at 16, which has a plurality of vanes 17, extending radially outward from the center. A portion 18 of each such vane or a separately attached vane 18 underlies the scroll outlet 15 and the area through which the rotor vanes 13 pass in rotation. The stator 16 also includes an outer casing, shown generally at 19, having upstanding wall portions 20 and 21, and a box portion 22 on the side of the casing coinciding with scroll 14. Vane portions 18 are attached to casing 19 at box portion 22. In addition, the stator 16 is shown to include a support ring, indicated generally at 23, fixedly attached to stator vanes 17.

Particular features of this invention will better be understood by reference to the simplified representation of FIGURES 2 and 3. In FIGURE 2, the outer casing generally indicated at 19 is shown comprising a first portion 24, which is solid or continuous, and extends about a portion of the circumference of the casing. The outer casing 19 further includes a second circumferential portion 24a, which is comprised of a plurality of segments 25 separated by spaced openings, such as indicated at 26 in FIGURE 2. Joining these segments 25 of portion 24a are a plurality of expansible members 27, bridging spaced openings 26, and fixed about the outside surface of portion 24a of casing 19.

With reference to FIGURES 1 and 3, a ring 28 is shown, having generally the diameter of outer casing 19. This ring 28 is shown to comprise a first portion 29, which is smooth and uninterrupted, and a second portion 30, having a first plurality of slots 31 spaced about and extending into the inner peripheral surface of portion 30, and a second plurality of slots 32 spaced about and extending into the outer peripheral surface of portion 30. Slots 31 extend radially outward a portion of the width of ring 28, while slots 32 extend radially inward a portion of the width of ring 28. Successive ones of slots 31 and 32 extend toward one another, but are staggered or offset so as to lie alongside one another.

It will be apparent that portion 24a of casing 19, and portion 30 of ring 28 coincide with that portion of the casing and ring about which scroll 14 is disposed and, hence, that portion is subjected to the hot gases directed into the turbine for driving the rotor described above. In the actual assembly of the gas turbine of the invention, ring 28 lies about the top of the upstanding wall of casing 19 in the manner of a flange, the two members being suitably joined, as by welding. In this arrangement, slots 31 in ring 28 coincide with openings 26 between the segments of casing 19 as seen in FIGURES 4 and 6.

Lying intermediate the outer ring 19, 28 and the inner portion or hub area of turbine stator 16 is the ring assembly 23, fixed integrally with and joining portions 17 and 18 of the radial stator blades. This ring assembly 23 may be a single box-like unit or include inner and outer ring sections 33 and 34, respectively both constructions having inner and outer contiguous sections. Each section, 33 and 34, is of box-like cross-section. The entire ring assembly 23 separates the outer portion of the stator 16, which is subjected to the hot propelling gases, from the inner, relatively cold portion. Inner section 33 is solid, while outer section 34 has provided therein a plurality of spaced, radial slots 35 about its outer periphery.

In operation, when hot propelling gases are directed into the partial circumference of the turbine, driving the rotor vanes 13, the outer portion of stator 16 likewise becomes subjected to the hot gases. The tip vanes 13 of the rotor have a tendency to expand radially outward. While the vanes 17 of stator 16 are relatively insulated from the hot gases by ring 23, stator vane portions 18 receive the hot blast of the propelling gases. Expansion due to heat of stator vane portion 18 and rotor vanes 13 will be substantially the same. Outer casing 19 and ring 28 are also subjected to the hot blast. Absent provision for compensation, expansion of the ring and casing, added to expansion of the stator vanes to which they are attached, would result in a larger and unequal expansion of the ring and casing relative to the rotor vanes. This would result in an increased rotor tip clearance, and hence, undesirable losses in the use of the energy of the propelling gases.

However, this undesirable expansion of the outer casing and ring, with its attendant deleterious effect upon turbine performance, is obviated by the compensation and controlled expansion provided by the unique features of this invention. Under the influence of heat, the segments 25 of outer casing 19 expand toward one another, spaced openings 26 merely growing more narrow as these segments expand. It will thus be seen that outer casing 19 is allowed to grow only tangentially, rather than radially. The only radial growth of casing 19, therefore, is that which is inherent in the stator vane portions 18, and this growth is essentially matched by that of the rotor vanes 13.

Likewise, the slots 31 and 32 permit ring 28 to expand and contract with heat variation. Slots 31 of ring 28 coincide with spaced openings 26 of casing 19, and both ring and casing are rigidly joined; therefore, both members perfectly cooperate in expansion and contraction. It will be noted that spaced openings 26 in outer casing 19 are extended about the box-like portion 22 to which are fixed the stator vane portions 18, so that the temperature compensation is inherent in the entire structure.

The resilience of expansible members 27 permits natural expansion and contraction of ring segments 25, while retaining the segments in their annular, spaced relation. In addition to this spacing and bridging function, members 27 perform the additional essential functions of both sealing the spaced openings 26 against release of the propelling gases within the outer casing 19, and stiffening the casing to provide the necessary rigidity.

As shown by FIGURE 4 of the drawings, dimensional change is compensated for in the intermediate ring 23 by the slots 35. While the inner ring section 33 is relatively cold, and not subjected to marked temperature variation, the outer ring section 34 is contacted by the hot propelling gases driving rotor vanes 13, and is caused to expand and contract with the temperature variation. Slots 35, therefore, are provided only in outer section 34, and more specifically on the outer side thereof so as to extend radially inward a portion of the width of the section 34. With this arrangement, the abutting sides of sections 33 and 34 are in fixed relation to one another, thus retaining the firmness and rigidity of ring 23 while the necessary compensation for expansion and contraction is provided by means of the slots on the outer circumference only.

For purposes of illustration, this invention has been described within the environment of a device wherein the propelling gases are admitted about only a portion of the circumference of the turbine. In this design, it will be noted by reference to FIGURE 1 that the tip clearance between rotor vanes 13 and the "cold" wall of casing portion 21 is illustrated as being greater than the clearance between the rotor vanes and the "hot" wall of casing portion 20. This is necessary since, while the "hot" side is provided with the inherent growth compensation of the invention, the "cold" side is not. The rotor vanes 13, however, which are subject to expansion under heat, must be permitted to clear the "cold" wall portion 21 as well as the "hot" wall portion 20. For this reason, the extra clearance is provided on the "cold" side. No loss of propelling energy results, since there is no propelling effect of the gases on that side.

While the foregoing illustration and description in a partial gas admission environment is illustrative only, it will be understood by those skilled in the art that the instant invention would have application to a full 360 degree admission of propelling gases, as well. In such a design, the full circumference of the casing 19 would be segmented and the full circumference of the ring 28 would be slotted. Similarly, the full circumference of outer section 34 of intermediate ring 23, if such were provided, would be provided with the radial slots 35.

Although the foregoing embodiments have been illustrated and described, it is apparent that other changes and modifications may be made in the construction and arrangement of the various parts without departing from the scope of this invention.

What I claim as new and desire to secure by Letters Patent of the United States is:

1. In a stator for a gas turbine, a cylindrical outer casing having an edge surface, a relatively flat outer ring having a peripheral surface, said ring being fixedly secured about said edge of said casing in the manner of a flange, said casing having a plurality of spaced segments and a plurality of resilient members, respective ones of said resilient members joining respective ones of said segments to form a unitary structure, said ring having a plurality of slots disposed about said peripheral surface.

2. In a stator for a gas turbine, a cylindrical outer casing having an edge surface, a relatively flat outer ring having an inside and an outside peripheral surface, said ring being fixedly secured about said edge surface of said casing in the manner of a flange, said casing having a plurality of spaced segments and a plurality of resilient members, respective ones of said resilient members joining respective ones of said segments to form a unitary structure, said ring having a first plurality of slots disposed about said inside peripheral surface and a second plurality of slots disposed about said outside peripheral surface.

3. In a stator for a gas turbine driven by gas directed about a sector of the circumference of said turbine, an outer cylindrical casing having an edge surface and comprising a first circumferential portion having a plurality of segments separated by spaces and a second unbroken circumferential portion, said casing having a plurality of resilient members, respective ones of said resilient members joining respective ones of said segments to each other and to said second portion to form a unitary structure, a relatively flat outer ring having an inside and an outside peripheral surface, said ring being fixed about said edge surface of said casing in the manner of a flange, said ring having a first plurality of slots disposed about said inside peripheral surface and coinciding with said spaces between said segments, and a second plurality of slots in said ring disposed about said outside peripheral surface.

4. In a stator for a gas turbine having rotor blades carrying rotor vanes at the tips thereof, a first annular member spaced from the outer periphery of said rotor vanes and having a plurality of spaced segments, a plurality of resilient members, respective ones of said resilient members joining respective ones of said spaced segments to form a unitary structure, a second annular member spaced radially inwardly from said first annular member by a distance substantially equal to the length of said vanes, a plurality of radial vanes joining said first annular member and said second annular member, said second annular member comprising inner and outer contiguous closed sections, and a plurality of spaced radial slots disposed about the outer periphery of said outer section.

5. The invention of claim 4 wherein said turbine is driven by gas directed about a sector of said turbine, said spaced segments and said resilient members comprising a portion of said first annular member coinciding with said sector of the turbine, and said spaced slots being provided about a portion of said second annular members coinciding with said sector of the turbine.

References Cited in the file of this patent

UNITED STATES PATENTS

| | | |
|---|---|---|
| 1,378,464 | Junggren | May 17, 1921 |
| 2,584,899 | McLeod | Feb. 5, 1952 |
| 2,610,823 | Knowlton | Sept. 16, 1952 |
| 2,625,013 | Howard et al. | Jan. 13, 1953 |
| 2,651,492 | Feilden | Sept. 8, 1953 |
| 2,658,719 | Johanson | Nov. 10, 1953 |

FOREIGN PATENTS

| | | |
|---|---|---|
| 726,951 | Germany | Oct. 23, 1942 |
| 623,525 | Great Britain | May 18, 1949 |
| 833,072 | Great Britain | Apr. 21, 1960 |